(12) United States Patent
Kroisleitner et al.

(10) Patent No.: US 12,431,558 B2
(45) Date of Patent: Sep. 30, 2025

(54) COOLING MODULE FOR BATTERIES OF AN ELECTRIC OR HYBRID VEHICLE

(71) Applicant: BorgWarner Inc., Auburn Hills, MI (US)

(72) Inventors: Christian Kroisleitner, Friedberg (AT); Román Carballido, Vigo (ES); Miguel Suarez, Vigo (ES); Xoán Hermida, Gondomar (ES); Francisco Lozano, O Porriño (ES)

(73) Assignee: BorgWarner Inc., Auburn Hills, MI (US)

( * ) Notice: Subject to any disclaimer, the term of this patent is extended or adjusted under 35 U.S.C. 154(b) by 142 days.

(21) Appl. No.: 18/483,424

(22) Filed: Oct. 9, 2023

(65) Prior Publication Data

US 2024/0128534 A1 Apr. 18, 2024

(30) Foreign Application Priority Data

Oct. 17, 2022 (EP) .................................. 22 20200 9
Feb. 15, 2023 (EP) .................................. 23 156 891

(51) Int. Cl.
*H01M 10/6557* (2014.01)
*H01M 10/613* (2014.01)
*H01M 10/625* (2014.01)
*H01M 10/6568* (2014.01)
*B60K 11/02* (2006.01)

(52) U.S. Cl.
CPC ..... *H01M 10/6568* (2015.04); *H01M 10/613* (2015.04); *H01M 10/625* (2015.04); *H01M 10/6557* (2015.04); *B60K 11/02* (2013.01); *H01M 2220/20* (2013.01)

(58) Field of Classification Search
CPC ........... H01M 10/6556; H01M 10/647; H01M 10/60; Y02E 60/10; F28F 9/0258; F28D 1/0325; B60L 50/64
See application file for complete search history.

(56) References Cited

U.S. PATENT DOCUMENTS

2007/0039717 A1 2/2007 Inagaki et al.
2009/0301700 A1 12/2009 German et al.
(Continued)

FOREIGN PATENT DOCUMENTS

CN 110199430 B * 3/2023 .............. F28F 13/06
EP 2 962 355 A2 1/2016
(Continued)

*Primary Examiner* — Ana M Vazquez
(74) *Attorney, Agent, or Firm* — Bose McKinney & Evans LLP (57) ABSTRACT

A cooling module for batteries of an electric or hybrid vehicle has a coolant supply line, a coolant discharge line, and a plurality of flat tubes arranged side by side, between which there is space for batteries to be cooled, each of the flat tubes being connected to the coolant supply line or the coolant discharge line. The flat tubes each carry connectors. The coolant supply line and the coolant discharge line are each assembled from a plurality of line segments connected by a connector of one of the flat tubes to one of the connectors of an adjacent flat tube. A spacer strip is arranged between adjacent flat tubes. The spacer strip delimits between itself and each of the two adjacent flat tubes spaces for batteries that are to be cooled.

14 Claims, 6 Drawing Sheets

(56) References Cited

U.S. PATENT DOCUMENTS

2016/0003553 A1  1/2016  Campbell
2017/0162922 A1  6/2017  Sumpf, Jr. et al.
2023/0023894 A1  1/2023  Barre et al.
2023/0127378 A1  4/2023  Jovet et al.

FOREIGN PATENT DOCUMENTS

EP          4 138 176 A1     2/2023
WO     WO 2021/123550 A1     6/2021
WO     WO 2021/185992 A1     9/2021
WO     WO 2023/046530 A1     3/2023

* cited by examiner

COOLING MODULE FOR BATTERIES OF AN ELECTRIC OR HYBRID VEHICLE

RELATED APPLICATIONS

This application claims priority to EP 23 156 891.6, filed Feb. 15, 2023, and EP 22 202 009.1, filed Oct. 17, 2022, the entire disclosures of both of which are hereby incorporated herein by reference.

BACKGROUND

This disclosure relates to a cooling module for batteries of an electric or hybrid vehicle.

Batteries of electric or hybrid vehicles must be cooled during operation with coolant, usually an aqueous liquid. At low temperatures, the coolant may also be heated and thus used to heat up the batteries.

SUMMARY

This disclosure teaches a cooling module for batteries of electric or hybrid vehicles that is inexpensive to manufacture and can be adapted to the number of batteries, or battery cells, of an electric or hybrid vehicle with little effort.

A cooling module accordance to this disclosure has a coolant supply line, a coolant discharge line, and a plurality of flat tubes arranged side by side, between which there is space for the batteries that are to be cooled, and which are attached to the coolant supply line and the coolant discharge line. The individual flat tubes can thus, located in parallel with one another, be connected to the coolant supply line and the coolant discharge line, and may run at right angles to the coolant supply line and the coolant discharge line. According to this disclosure, the flat tubes each have connectors, and the coolant supply line and the coolant discharge line are each assembled from a plurality of line segments, each of which connects a connector of one of the flat tubes to a connector of an adjacent flat tube. The line segments may be formed by the connectors or line segments may be separate parts in addition to the connectors.

In a cooling module according to this disclosure, some or all batteries or battery cells abut only with one side to one of the flat tubes and abut on their opposite side a spacer strip that is arranged between neighbouring flat tubes. The spacer strip may be made of plastic for costs savings or of metal. In many applications, it is not necessary that batteries, or battery cells, on opposite sides to abut against one of the flat tubes. Whenever smaller cooling capacities suffice, costs can be saved if batteries or battery cells abut on one side one of the flat tubes, and on an opposite side to abut against a spacer strip, which runs between two adjacent flat tubes.

In a refinement of this disclosure, the spacer strip has an extension, by which it is attached to the coolant supply line and/or the coolant discharge line. The extension may, for example, extend between the coolant supply line and the coolant discharge line, if both are arranged on the same side. Batteries, or battery cells, may be adhesively bonded to such a spacer strip. Advantageously, batteries can thus be mechanically fixed by the spacer strip, without impairing the thermal coupling with the flat tube connected to the same battery as the spacer strip. However, it is also possible for such a spacer strip to be clamped between batteries, or battery cells. Spacer strips may also be used at an end of the cooling module such that all flat tubes are touched on both sides by batteries.

In a further refinement of this disclosure, provision is made for the spacer strips to have the same thickness as the flat tubes. The thickness of a flat tube as well as the thickness of a spacer strip is to be measured between a surface facing batteries or battery cells and an opposite surface, wherein any local recesses or depressions in a surface are to be ignored on both sides. In this context, the term "the same thickness" is to be understood to mean that the thicknesses of the flat tubes and the spacer strips are identical within manufacturing tolerances. For applications in which a reduced cooling capacity is sufficient, and batteries therefore abut against a flat tube on only one side, some flat tubes are replaced by spacer strips.

In this way, the number of flat tubes of a cooling module and thus the number of spaces for the batteries that are to be cooled, can be adapted to vehicle manufacturers' requirements with little effort.

Depending on the shape of the batteries, or battery cells, the flat tubes can be of corrugated or planar design. Corrugated flat tubes are particularly suitable for cylindrical batteries, while flat tubes of planar design are particularly suitable for cuboid batteries, or battery cells. The batteries can, for example, be adhesively bonded onto the flat tubes, or attached to them in some other way. In the case of cuboid shaped batteries flat tubes may be used that touch not only a front side or a back side of batteries, but additionally also part of a lateral side. The flat tubes may be bent correspondingly, for example.

In a refinement of this disclosure, the spacer strips may comprise a groove that is an intermittent groove that runs alternatingly on opposite sides of the spacer strip. When batteries or battery cells are joined to the spacer strip by means of an adhesive, the groove may be filled with adhesive, especially any excess amount of adhesive that is originally applied to bonding surfaces adjacent to the groove.

If corrugated flat tubes and spacer strips are used, e.g., for cylindrical batteries or battery cells, both opposing surfaces of the spacer strips have sections that abut batteries or battery cells and are fixed to them by an adhesive. Surface sections that comprise a groove for adhesive alternate in longitudinal direction with sections that are not involved with fixing the spacer strip to batteries or battery cells and therefore do not need a groove. Hence, the groove is an intermittent groove, i.e., alternatingly arranged on opposite surfaces of each spacer strip. A spacer strip with such an intermittent groove also has a higher mechanical stability than a spacer strip with continuous grooves on both sides. Moreover, such an intermittent groove allows maintaining homogeneous strength of the material in a region surrounding the groove.

In a further refinement of this disclosure, the groove is arranged between bonding surfaces for boding the spacer strip to a battery or battery cell by an adhesive, wherein in longitudinal direction of the spacer strip the boding surfaces alternate with recessed surfaces. The recessed surfaces are not involved in fixing the spacer strip to a battery of battery cell and can be used reduce weight of the spacer strip and safe costs. The recessed surfaces may be limited by webs in order to preserve mechanical stability despite reduced thickness of the spacer strip in the area of the recesses. For example, webs may cross to form an X.

In a further refinement of this disclosure, the extension of the spacer strip comprises an opening through which the coolant supply line or the coolant discharge line pass. Thereby, assembly of the cooling module can be facilitated. For example, the spacer strip may form a clipped or snap-locked connection with the coolant supply line or the coolant discharge line. For such a connection, the coolant supply line and the coolant discharge line may be provided with an abutment ring that abuts the extension of the spacer strip around the opening. Snap-in hooks may extend from the abutment ring and cause a clipped or snap-locked connection with the extension. The opening may have circumferential recesses for these hooks.

The flat tubes may be made inexpensively of plastic. Another option is to make the flat tubes from metal, for example, from an aluminium alloy, with which an improved thermal coupling of the coolant to the batteries, or battery cells, can be achieved.

Flat tubes made from metal can be produced, for example, as extruded sections, which may be deformed, for example, corrugated, after extrusion.

In an advantageous refinement of this disclosure, provision is made for the connectors to be attached to end pieces, which are attached to ends of the flat tubes. Such end pieces may be attached to the flat tubes, for example, by means of a push-fit connection or a plug-in connection. Alternatively or additionally, a materially bonded connection can be used, for example, in the form of adhesive bonding, soldering, brazing or welding. Connectors may be formed integrally with the end pieces, or may be attached to the end pieces as separate components, for example, by means of a push-fit connection or plug-in connection. Alternatively or additionally, the connectors can also be connected to the relevant end piece by means of a material bond, for example, in the form of adhesive bonding, soldering or welding.

In the cooling module, the flat tubes may run between the coolant supply line and the coolant discharge line. In this case, the flat tubes have an end piece at each of their two ends, with which they are connected by way of connectors to the coolant supply line and the coolant discharge line. Alternatively, the flat tubes may each carry at only one end an end piece with a plurality of connectors. The coolant supply line and the coolant discharge line then run at right angles to the flat tubes on the same side. In this case, each flat tube forms at least two channels running side by side, namely an outward channel and a return channel. Such a flat tube can be manufactured from the outset as an extrusion with a central web separating the two channels or a plurality of outward channels and a plurality of return channels. Alternatively, a flat tube may also be extruded without a web and compressed in a central region in its longitudinal direction, and its top and bottom surfaces then be welded together in this central region. The end of the flat tubes not used for connection to the coolant supply line and the coolant discharge line is then closed with a deflector that connects the two channels of the flat tube. Such a deflector may be made of metal or plastic and can, for example, be connected to the flat tubes by means of a push-fit connection or a plug-in connection. Alternatively or additionally, the end piece can also be connected to the relevant flat tube by means of a material bond, for example, in the form of adhesive bonding, soldering or welding.

In an advantageous refinement of this disclosure, an end piece of a flat tube may form both a connector for the coolant supply line and also a connector for the coolant discharge line. In this way, the number of parts can be reduced, and thus inexpensive production can be achieved. However, it is also possible to use a separate end piece for each of the channels of the flat tube, each of which is connected only to the coolant supply line or only to the coolant discharge line.

In an advantageous refinement of this disclosure, the line segments of the coolant supply line and the coolant discharge line may be connected to the connectors by means of a push-fit connection or a plug-in connection. The connectors may be inserted into the line segments, or the line segments may be inserted into the connectors. The end pieces may carry both a connector, into which one of the line segments is inserted, and also an inner part, which projects into the line segment concerned. The inner part may carry an annular seal, for example, in an annular groove. In this way, not only can leakage be reliably prevented, but manufacturing tolerances with regard to the alignment of the components involved in the push-fit connection or plug-in connection can also be compensated for. In addition, the seal between the line segment and the inner part can be protected by the connector.

Flat tubes, which sit between flat tubes, may be designed with end pieces, which each have connectors on opposite sides for the coolant supply line and the coolant discharge line. Here it is possible for the connectors to be designed identically on both sides, for example, to be designed on both sides as a male part of a push-fit connection or plug-in connection, or designed on both sides as a female part of a push-fit connection or plug-in connection. In one configuration of this disclosure, however, it is also possible for the connectors in each case to be designed on one side of the end piece as a male part of a push-fit connection or plug-in connection, and on an opposite side of the end piece as a female part of a push-fit connection or plug-in connection. If an end piece thereby carries both connectors for segments of the coolant supply line, and also for segments of the coolant discharge line, it is also possible on each side of the end piece for both a connector for a male push-fit connection or plug-in connection, and also a connector for a female push-fit connection or plug-in connection, to be provided. In this case it is especially advantageous if an end piece which carries connectors both for the coolant supply line and for the coolant discharge line, the end piece has on each side both a male and a female connector. An assembly of one flat tube with end pieces and connectors can then be in two different orientations, i.e., turned along its longitudinal axis by 180°, for the cooling module.

As described above, this disclosure relates to a cooling module for batteries of an electric or hybrid vehicle, that is to say, a cooling module that has not yet been populated with the appropriate batteries. However, this disclosure also relates to such a cooling module with batteries, that is to say, in particular to a cooling module with a coolant supply line, a coolant discharge line, a plurality of flat tubes arranged side by side, between which the batteries that are to be cooled are arranged, and which are connected to the coolant supply line and the coolant discharge line, wherein the flat tubes each carry connectors, and wherein the coolant supply line and the coolant discharge line in each case are assembled from a plurality of line segments, which each connect a connector of one of the flat tubes to a connector of an adjacent flat tube. The line segments may be formed by the connectors or line segments may be separate parts in addition to the connectors.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

FIGS. 1 to 5 schematically show a cooling module for batteries of an electric or hybrid vehicle. The cooling module comprises a coolant supply line 1, a coolant discharge line 2, and a plurality of flat tubes 3. The flat tubes 3, located in parallel with one another, are connected to the coolant supply line 1 and the coolant discharge line 2. The flat tubes 3 run at right angles to the coolant supply line 1 and the coolant discharge line 2. Between adjacent flat tubes 3 there is space for batteries 7 to be cooled. The batteries 7 may, for example, be adhesively bonded to the sides of the flat tubes 3.

In the embodiment shown, the flat tubes 3 are of planar design, and are thus adapted to batteries 7 with a planar outer surface, for example, cuboid batteries. Alternatively, the flat tubes 3 may also be of corrugated design, for example, for circular cylindrical batteries. The flat tubes 3 may be made of metal, for example, an aluminium alloy, or plastic.

In the embodiment shown, the coolant supply line 1 and the coolant discharge line 2 are arranged at opposite ends of the flat tubes 3. The flat tubes 3 contain one or a plurality of channels extending from one end of the flat tube 3 to the opposite end. However, it is also possible that the coolant supply line 1 and the coolant discharge line 2 are arranged at the same end of the flat tubes 3. Then the flat tubes 3 contain at least two channels, namely an outward channel and a return channel. Each flat tube 3 may be provided with a plurality of outward channels and return channels in order to improve mechanical stability. Channels may be separated in the flat tube 3 by an inner wall or a weld seam that connects the front and rear sides of a flat tube 3. If the coolant supply line 1 and the coolant discharge line 2 are at the same end of the flat tubes 3, the flat tubes 3 carry at their end facing away from the coolant supply line 1 and the coolant discharge line 2, a deflector, not shown in the figures, which connects the outward channel with the return channel. The deflector may be connected to the flat tubes 3, for example, by means of a push-fit connection, a plug-in-connection and/or a materially bonded connection, for example, in the form of brazing, welding or adhesive bonding.

The coolant supply line 1 and the coolant return line 2 are each assembled from a plurality of line segments, and are connected to the flat tubes 3 by way of connectors 6. Therein the connectors may for line segments or the connectors may connect line segments provided as separate parts. At their ends, at which the flat tubes 3 are connected to the coolant supply line 1 and the coolant return line 2, respectively, the flat tubes 3 carry an end piece 5, which is connected to the flat tubes 3 by means of a push-fit connection, a plug-in connection and/or by means of a partially bonded connection, for example, in the form of brazing, welding or adhesive bonding. The connectors 6 are attached to these end pieces 5, for example, by means of a partially bonded connection, and/or by means of a push-fit or plug-in connection.

In the embodiment shown in FIGS. 1 to 5, line segments of the coolant supply line 1 and the coolant discharge line 2 are inserted into connectors 6. In the connectors 6 line segments may be surrounded by sealing rings 12, in order to compensate for tolerances in the alignment of the connectors, and to prevent leakage.

In the embodiment shown in FIGS. 1 to 5, a spacer strip 8 is arranged between neighbouring flat tubes 3. Batteries 7 are held between one of the flat tubes 3 and one of the spacer strips 8. Thereby batteries 7 are cooled on one side only, namely on the side that abuts against one of the flat tubes 3, while the opposite side abutting a spacer strip 8 is not cooled. This is sufficient for many cases.

The spacer strips 8 may be made inexpensively of plastic, and can be provided, for example, with an extension 11 that touches the coolant supply line 1 and/or the coolant discharge line 2, e.g., with an U-shaped extension, a C-shaped extension, or an extension that has an opening through which the coolant supply line or the coolant discharge line passes. If the coolant supply line 1 and the coolant discharge line 2 are arranged on the same end of the flat tubes 3, the extension 11 may project between the coolant supply line 1 and the coolant discharge line 2 to facilitate positioning during assembly. An extension 11 of the spacer strips 8 that abuts the coolant supply line 1 and the coolant discharge line 2 facilitates assembly, especially if the extension has an opening for the coolant supply line 1 and/or the coolant discharge line 2. An opening, e.g., a U- or C-shaped opening or a through hole, facilitates correct positioning of coolant supply line 1 and the coolant discharge line 2 with respect to the spacer strips 8.

The cooling module can also be used to heat the batteries by passing heated coolant through the cooling module. In frosty conditions, batteries at the edge of the cooling module often have an increased heating requirement, and it can therefore be advantageous to dispense with spacer strips 8 only in an end section of the cooling module, and to arrange the flat tubes 3 at correspondingly smaller distances from one another, so that such batteries abut against flat tubes on both sides.

Figure 1:
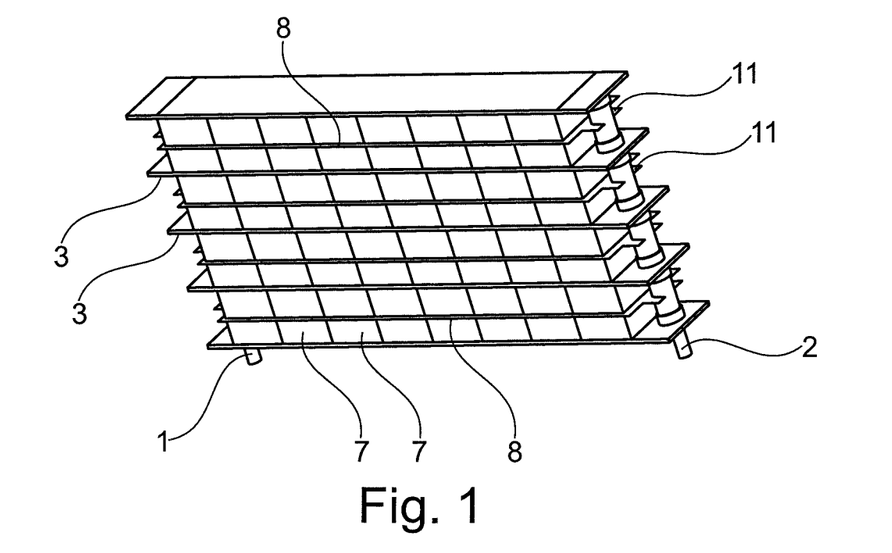
FIG. 1 shows a schematic representation of an embodiment of a cooling module in accordance with this disclosure.
Figure 2:
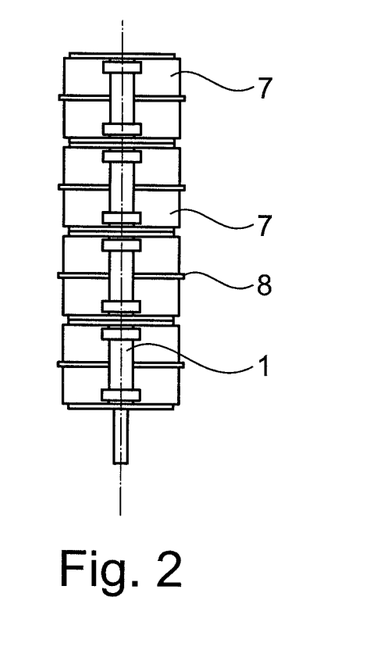
FIG. 2 shows a lateral view of the embodiment of FIG. 1.
Figure 3:
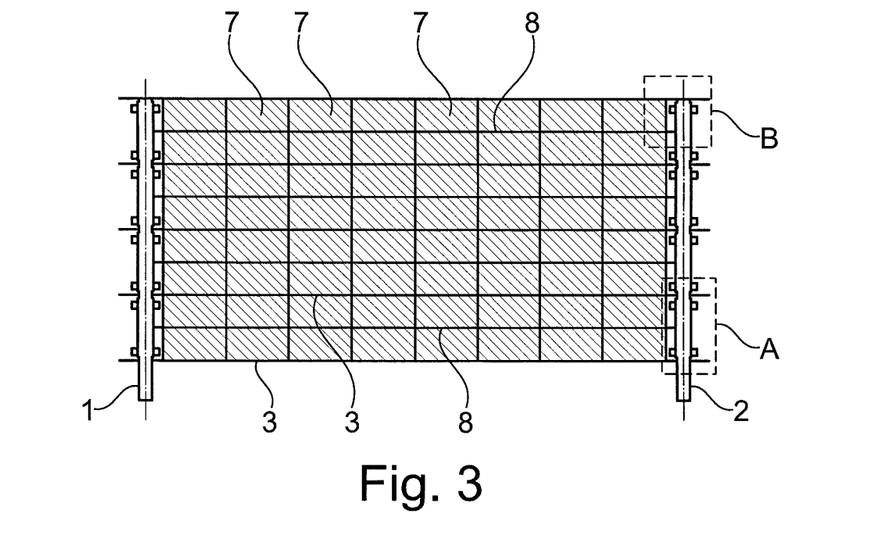
FIG. 3 shows a sectional view to FIG. 1.
Figure 4:
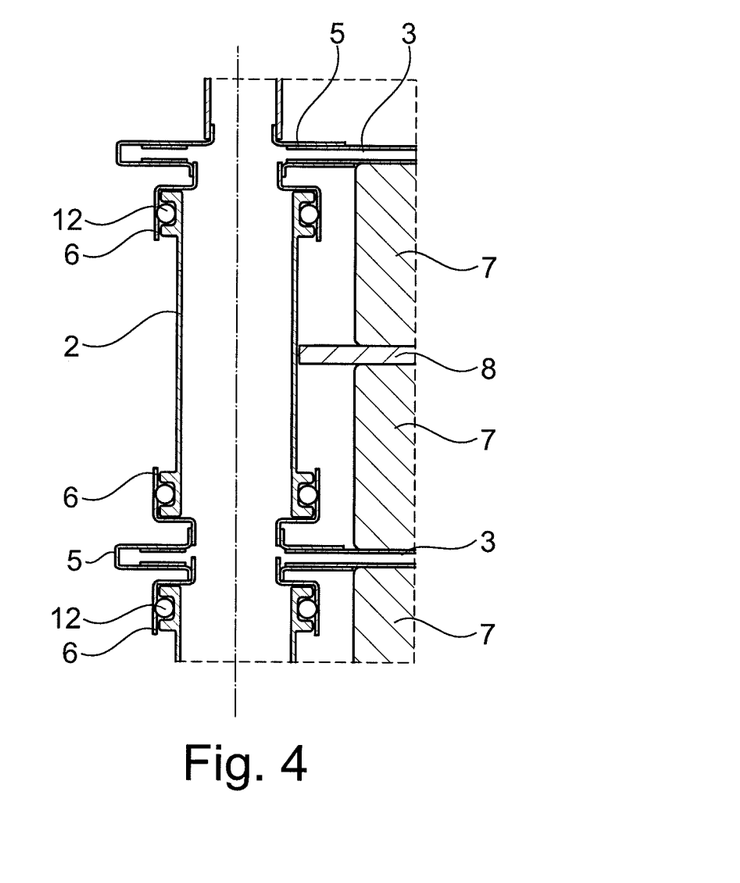
FIG. 4 shows a view of detail A of FIG. 3.
Figure 5:
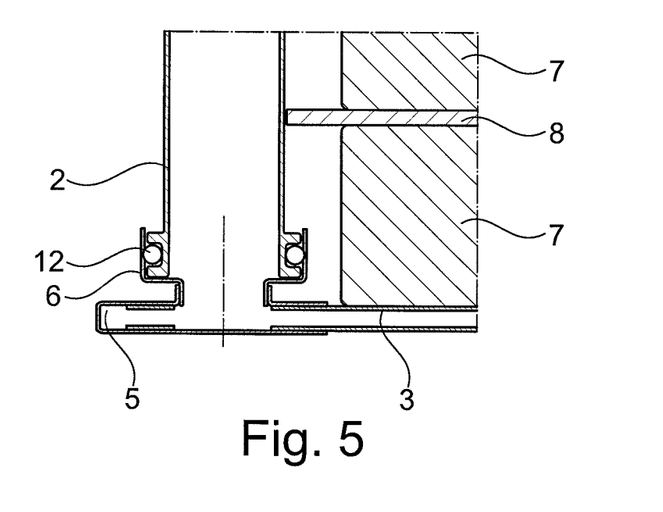
FIG. 5 shows a view of detail B of FIG. 3.

FIG. 4 shows detail A of FIG. 3 and FIG. 5 shows detail B of FIG. 3. FIGS. 3 to 5 show in detailed views, an end section of a flat tube 3 of the above-described cooling module, together with an end piece 5, attached to the flat tube 3 and carrying a connector 6 for purposes of connecting a line section of the coolant supply line 1 or the coolant discharge line 2.

The connector 6 surrounds an end section of a line segment of the coolant supply line 1 or the coolant discharge line 2. The line segment carries an annular seal 12, e.g., an O-ring in a groove.

It is also possible that the end piece 5 has an inner part in addition to connector 6. The connector 6 surrounds this inner part, which may carry an annular seal 10, for example, an O-ring, in an annular groove. The line section of the coolant supply line 1 or the coolant discharge line 2 then surrounds this inner part and projects into the connector 6, that is to say, it lies between the connector 6 and the inner part 9.

Figure 6:
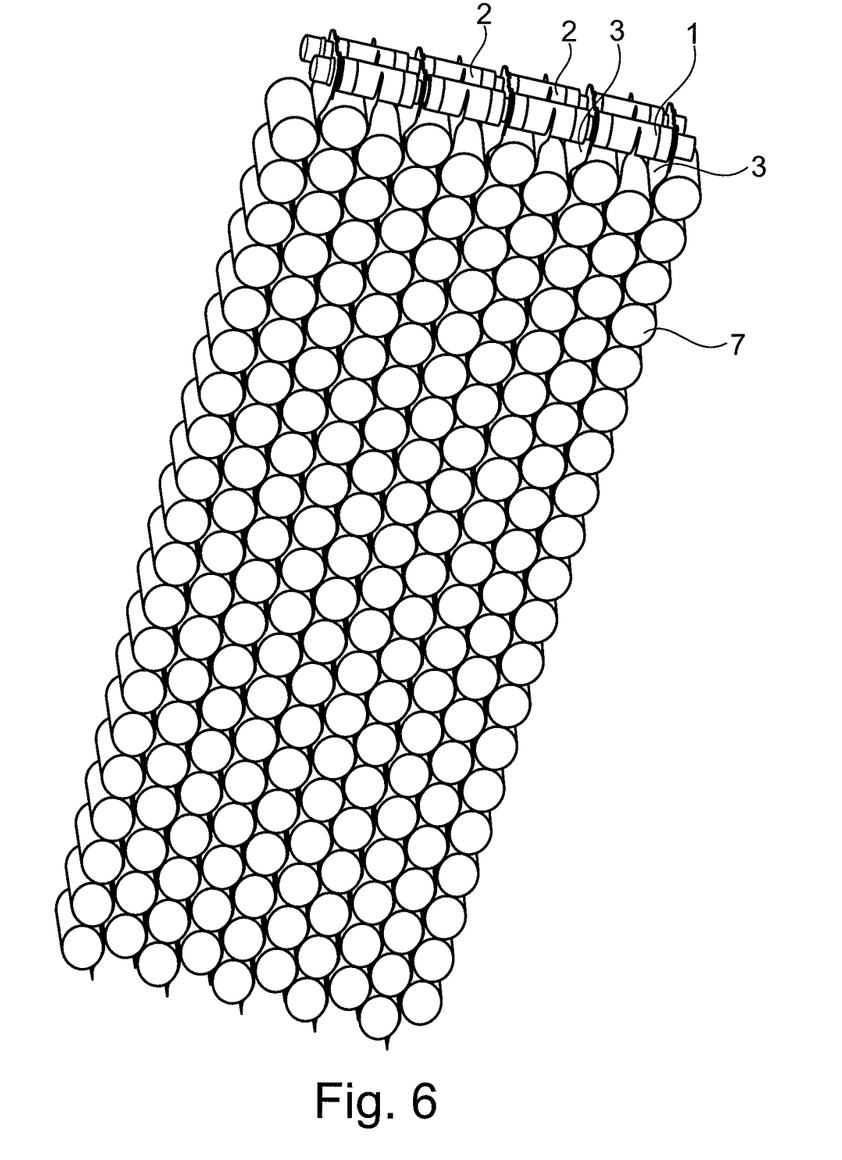
FIG. 6 shows a schematic representation of a further embodiment of a cooling module.

FIG. 6 shows schematically another embodiment of a cooling module for batteries of an electric or hybrid vehicle. This embodiment differs from the embodiment explained above in that corrugated flat tubes 3 and spacer strips 8 are used with circular cylindrical batteries 7 and in that both the coolant supply line 1 and the coolant discharge line 2 are arranged on the same side of the flat tubes 3.

Figure 7:
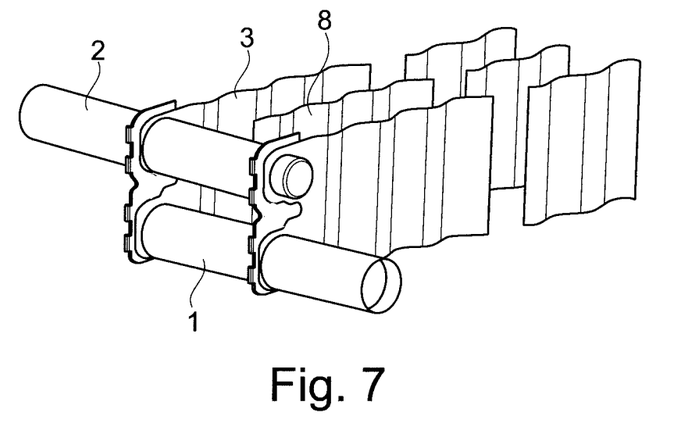
FIG. 7 shows a schematic detail of a further embodiment of a cooling module.

FIG. 7 shows schematically a detail of another embodiment of a cooling module comprising a coolant supply line 1, a coolant discharge line 2, a plurality of flat tubes 3, and spacer strips 8. In the embodiment of FIGS. 6 and 7, the extensions 11 of the spacer strips 8 have openings formed as through holes through which the coolant supply line 1 and the coolant discharge line 2, respectively, pass. In this respect it is to be noted that the connectors 6 may themselves form the coolant supply line 1 and the coolant discharge line 2 without additional line segments.

In the embodiment of FIG. 7, connectors 6 arranged at one of the ends of the flat tubes 3 are stuck into the line segments of the coolant supply line 1 and the coolant discharge line 2, respectively. Hence, the line segments of the coolant supply line 1 and the coolant supply line 2 are female parts of a push-fit or plug-connection, whereas the connectors 6 are male parts of that push-fit or plug-in connection.

Figure 8:
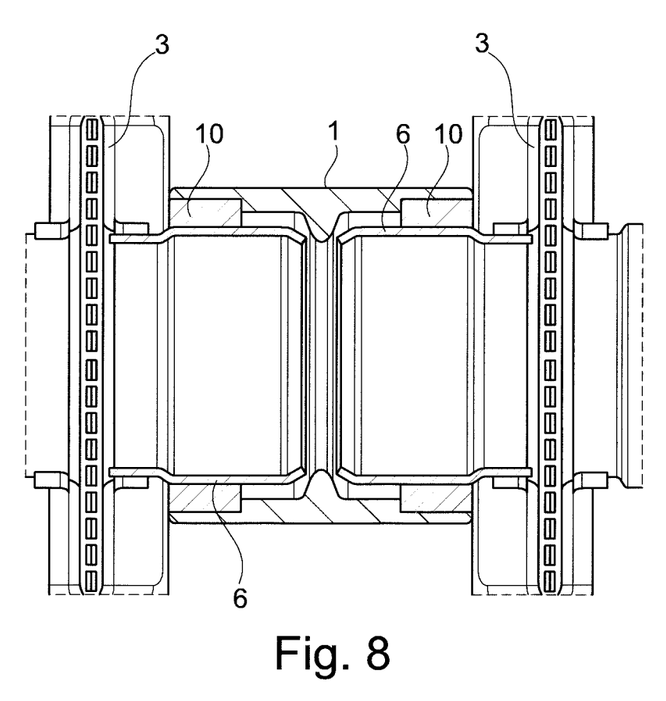
FIG. 8 shows a schematic cross-section of a detail of the embodiment of FIG. 7.

FIG. 8 shows a schematic cross-section of the connection of two segments of the coolant supply line 1 or the coolant supply line 2, respectively. As can be seen, connectors 6 of neighbouring flat tubes are stuck into a segment of the coolant supply line 1 (or the coolant discharge line 2 which may be formed in the same way). This segment surrounds the connectors 6 and carries on an inside an annular seal 10. The annular seals 10 each surround one of the connectors 6 and press against it.

In the embodiment shown in FIG. 8, a separate annular seal 10 is arranged inside the line segments for each connector 6. Alternatively, the annular seal 10 may also be single piece that presses against both connectors 6.

Figure 9:
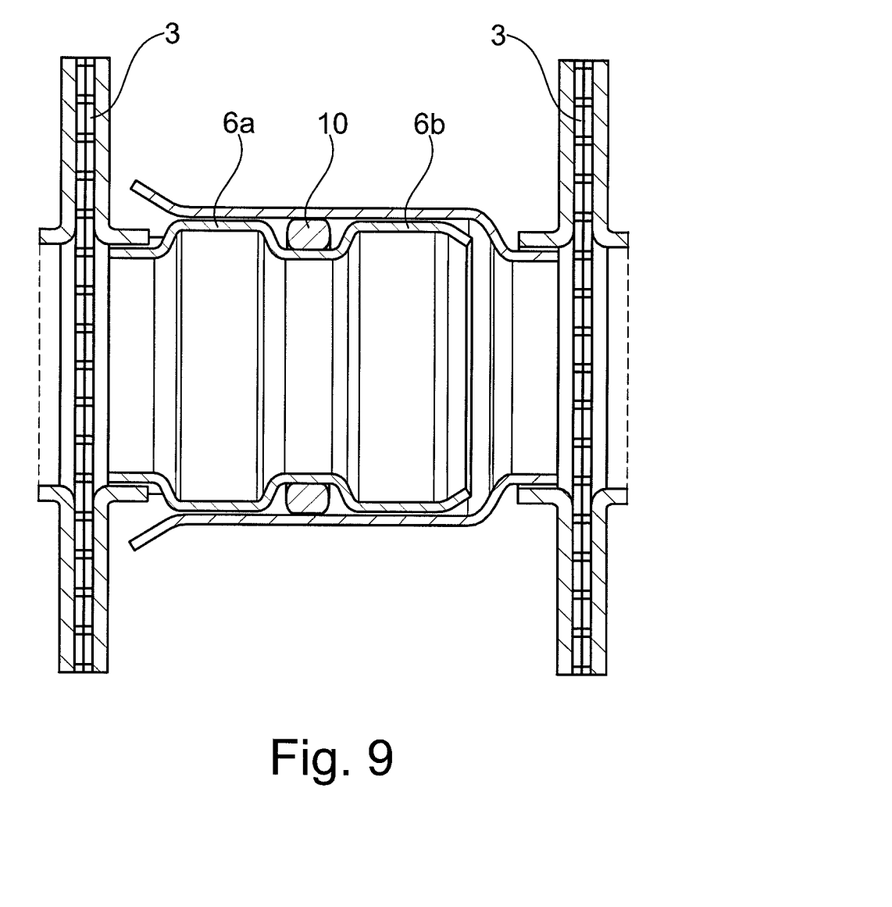
FIG. 9 shows a schematic cross-section of a detail of another embodiment.

FIG. 9 shows a detail of another embodiment of a cooling module for batteries of an electric or hybrid vehicle. This embodiment differs from the embodiment of FIGS. 1 to 5 in that the supply line and the discharge line are formed from connectors of adjacent flat tubes alone. That is the connectors alone form segments of the supply line as well as the discharge line and there are no separate tube segments attached to the connectors as shown, e.g., in FIG. 4.

As shown in FIG. 9, line segments of the supply line and the discharge line are formed by two connectors 6a, 6b wherein one of these connectors 6a is a male connector and the other connector 6b a female connector. The male connector 6a penetrates into the female connector 6b. An annular seal 10, e.g., an O-ring may be arranged between the male connector 6a and the female connector 6b, for example, in a groove of the male connector 6a.

Figure 10:
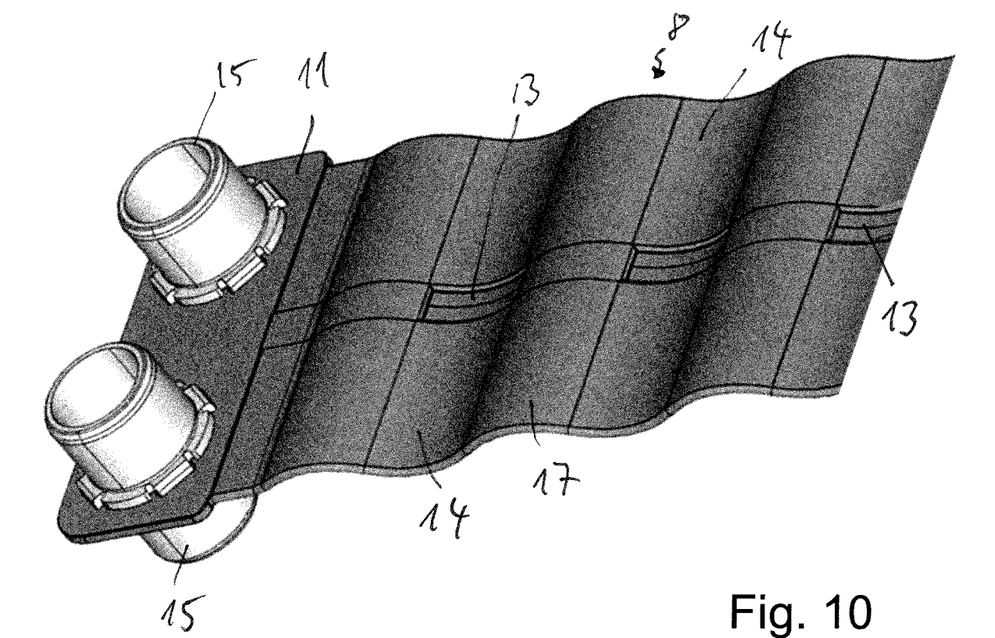
FIG. 10 shows an end section of a spacer strip with line segments.

FIG. 10 shows an embodiment of a spacer strip 8 which may be used for system as shown in FIGS. 7 and 8. The spacer strip 8 comprises an intermittent groove 13. The function of this groove 13 is take up any excess amount of adhesive that is applied to bonding surfaces 14 on both lateral sides of the groove 13. As can be seen in FIG. 10, the groove 13 is present only in valleys of the corrugated spacer strip 8. In sections of the spacer strip 8 that form hills the groove is discontinued. That is because cylindrical batteries are placed in the valleys and fixed to the spacer strip 8 in these valleys by an adhesive. As batteries or battery cells are fixed to both sides of the spacer strip, the intermittent groove 13 is on both sides of the spacer strip. Where the groove 13 ends on one side of the spacer strip 8 it begins on the other side of the spacer strip as a hill on one side of the spacer strip 8 is a valley on the opposite side.

The bonding surfaces 14 to be fixed by means of an adhesive to batteries or battery cells alternate in longitudinal direction of the spacer strips 8 with surfaces 17 not intended for contacting batteries. These surfaces 17 may be recessed surfaces (not shown). The bonding surfaces 14 are in the valleys of the corrugated spacer strip 8 and the surfaces 17 not intended for contacting batteries are on the hills of the corrugated spacer strip 8. Where the spacer strip 8 has a surface 17 on one side, there is a bonding surface 14 on the opposite side of the spacer strip 8, and vice versa.

Recessed surfaces alternating with bonding surfaces 14 may locally reduce the thickness of the spacer strip 8 and thereby reduce weight. Any recessed surfaces may be provided with webs in order to improve mechanical stability.

In their extensions 11, the spacer strips 8 have openings through which line segments 15 of the coolant supply line or the coolant discharge line respectively pass. The openings are through holes into which line segments 15 are inserted. An embodiment of such a line segment 15 is shown in FIGS. 12 and 13.

Figures 11, 12, 13:
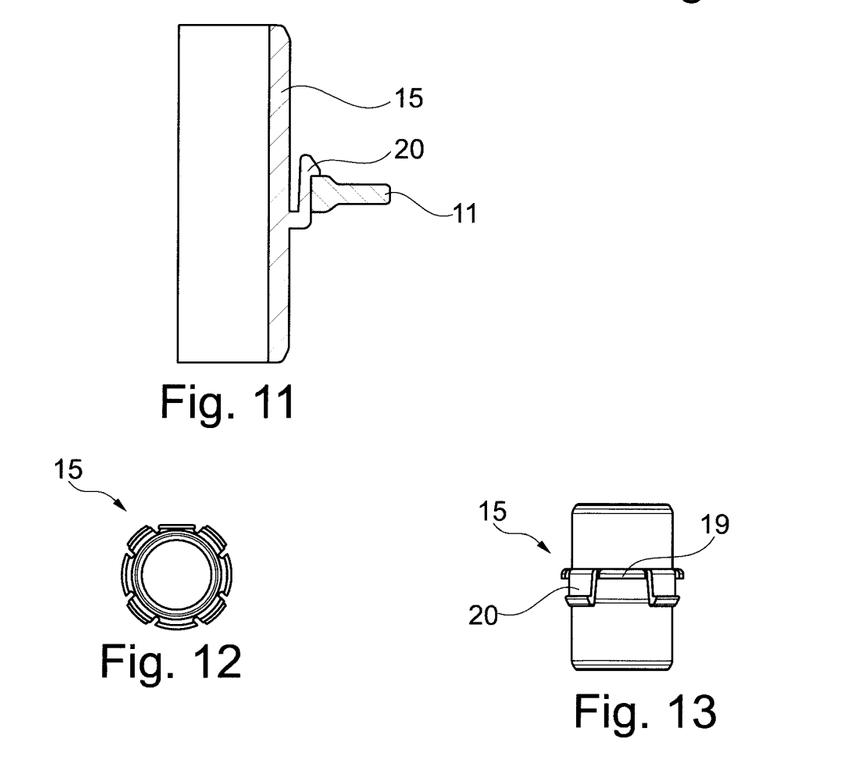
FIG. 11 shows a cross-section of a detail of FIG. 10.
FIG. 12 shows another view of the line segment of FIG. 10.
FIG. 13 shows another view of the line segment of FIG. 10.

FIG. 11 shows a cross-section of a detail of FIG. 10 illustrating how the line segments 15 may be fixed to the spacer strips 8. The line segments 15 are fixed to the spacer strips 8 by means of a clipped or snap-locked connection. The line segments 15 have an abutment ring 19 that abuts the spacer strip 8 when the line segment 15 is inserted into opening 16 of a spacer strip 8. The line segments 15 also comprise snap-in hooks 20, which may extend from the abutment ring 19, for example. The openings of the spacer strips 8 have circumferential recesses for accommodating the snap-in hooks 20. In this way an easy assembly of the system is facilitated.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE SYMBOLS

1 Coolant supply line
2 Coolant discharge line
3 Flat tube
5 End piece
6 Connector
7 batteries
8 Spacer strip
10 Annular seal
11 Extension
12 Seal 13 Groove
14 Bonding surface
15 Line segment
17 Recessed surface
19 Abutment ring
20 Snap-in hook

What is claimed is:

1. A cooling module for batteries of an electric or hybrid vehicle, the cooling module comprising:
   a coolant supply line;
   a coolant discharge line;
   a plurality of flat tubes arranged side by side, between which there is space for batteries to be cooled, each of the flat tubes being connected to the coolant supply line and the coolant discharge line;
   wherein the flat tubes each carry connectors and the coolant supply line and the coolant discharge line are each assembled from a plurality of line segments connected by a connector of one of the flat tubes to one of the connectors of an adjacent flat tube, and wherein a spacer strip is arranged between adjacent flat tubes, said spacer strip delimiting between itself and each of the two adjacent flat tubes spaces for batteries that are to be cooled and wherein the spacer strips have an extension, with which they touch the coolant supply line and/or the coolant discharge line.

2. The cooling module according to claim 1, wherein the flat tubes are corrugated.

3. The cooling module according to claim 1, wherein the connectors are attached to end pieces, which are attached to ends of the flat tubes.

4. The cooling module according to claim 3, wherein the flat tubes carry end pieces with connectors at opposite ends, and wherein the flat tubes run between the coolant supply line and the coolant discharge line.

5. The cooling module according to claim 3, wherein the flat tubes carry end pieces with connectors at only one end, and wherein the coolant supply line and the coolant discharge line run on the same side of the flat tubes, wherein the flat tubes each form at least two channels running side by side.

6. The cooling module according to claim 3, wherein the end pieces each carry connectors for the coolant supply line and the coolant discharge line.

7. The cooling module according to claim 1, wherein the extension comprises an opening through which the coolant supply line or the coolant discharge line pass.

8. The cooling module according to claim 7, wherein the coolant supply line and the coolant discharge line are held in the openings by snap-in hooks.

9. The cooling module according to claim 8, wherein the opening has circumferential recesses accommodating the snap-in hooks of the coolant supply line or the coolant discharge line.

10. The cooling module according to claim 9, wherein the snap-in hooks extend from an abutment ring that abuts a rim of the opening.

11. The cooling module according to claim 1, wherein the spacer strips have the same thickness as the flat tubes.

12. The cooling module according to claim 1, wherein the spacer strips comprise an intermittent groove that runs alternatingly on opposite sides of the spacer strip.

13. The cooling module according to claim 12, wherein the groove is arranged between bonding surfaces for bonding the spacer strip to a battery or battery cell by an adhesive, wherein in longitudinal direction of the spacer strip the bonding surfaces alternate with recessed surfaces.

14. The cooling module according to claim 13, wherein the recessed surfaces are bounded by webs.

* * * * *